US009506686B2

(12) United States Patent
Ko et al.

(10) Patent No.: US 9,506,686 B2
(45) Date of Patent: Nov. 29, 2016

(54) REFRIGERATOR AND METHOD OF MANUFACTURING INNER CABINET OF REFRIGERATOR

(71) Applicant: Samsung Electronics Co., Ltd., Gyeonggi-do (KR)

(72) Inventors: Jae Hong Ko, Gyeonggi-do (KR); Seung Ho Yoon, Gwangju (KR); Suk Hwan Kim, Gyeonggi-do (KR); Soo Hyung Ban, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/688,912

(22) Filed: Apr. 16, 2015

(65) Prior Publication Data

US 2015/0300725 A1   Oct. 22, 2015

(30) Foreign Application Priority Data

Apr. 17, 2014   (KR) .................. 10-2014-0046090

(51) Int. Cl.
| | | |
|---|---|---|
| *F25D 25/00* | (2006.01) | |
| *F25D 23/06* | (2006.01) | |
| *F25D 23/08* | (2006.01) | |
| *B29C 51/10* | (2006.01) | |
| *B29K 105/00* | (2006.01) | |
| *B29L 31/00* | (2006.01) | |

(52) U.S. Cl.
CPC ............ *F25D 23/065* (2013.01); *B29C 51/10* (2013.01); *F25D 23/064* (2013.01); *F25D 23/066* (2013.01); *F25D 23/08* (2013.01); *F25D 25/00* (2013.01); *B29K 2105/255* (2013.01); *B29L 2031/7622* (2013.01); *F25D 2201/10* (2013.01)

(58) Field of Classification Search
CPC .. F25D 2323/06; F25D 23/06; F25D 23/061; F25D 23/063; F25D 23/066; F25D 23/065; F25D 23/064; F25D 23/08; F25D 25/00; F25D 2201/10; B29C 51/10; B29K 2105/255

USPC ................... 312/406, 406.1, 406.2, 400, 401
See application file for complete search history.

(56) References Cited

U.S. PATENT DOCUMENTS 4,903,858 A * 2/1990 Clark ................... F25D 23/064
                                                             220/592.02
8,083,985 B2   12/2011 Luisi et al.
(Continued)

FOREIGN PATENT DOCUMENTS

DE   102013211734   * 12/2014
JP   2008-309435 A    12/2008
(Continued)

OTHER PUBLICATIONS

International Search Report, dated Jul. 27, 2015, in connection with Application No. PCT/KR2015/003561; 3 pages.

*Primary Examiner* — Janet M Wilkens (57) ABSTRACT

Disclosed herein is a refrigerator in which a level difference between an inner cabinet and an outer cabinet is improved in coupling the inner cabinet with the outer cabinet by forming a corner of the inner cabinet located at a portion coupled with the outer cabinet to have a smaller radius. The refrigerator includes an inner cabinet in which a storage chamber is formed. The refrigerator also includes an outer cabinet coupled with an outside of the inner cabinet and configured to form an exterior. The refrigerator further includes an insulating material filling between the inner cabinet and the outer cabinet. The inner cabinet includes a storage portion configured to form the storage chamber. The inner cabinet also includes an edge portion configured to extend in a vertical direction toward the outside of the storage portion from a front surface edge of the storage portion and exposed to the outside. The inner cabinet further includes a contact portion configured to extend in a vertical direction toward a rear direction from the edge portion and in contact with the outer cabinet when coupling with the outer cabinet. The inner cabinet includes a seating portion disposed in a rear direction of a front surface portion of the outer cabinet in contact with the contact portion and in parallel with the edge portion. The contact portion extends in a rear direction more than an end of the seating portion adjacent to the contact portion from the edge portion.

19 Claims, 10 Drawing Sheets

(56) References Cited

U.S. PATENT DOCUMENTS

8,881,398 B2 * 11/2014 Hanley ................ F25D 23/064
                                                                   29/469
2007/0001563 A1    1/2007   Park et al.
2013/0256304 A1   10/2013   Jessie et al.

FOREIGN PATENT DOCUMENTS

| KR | 100252160 A | | 5/2000 |
|----|-------------|---|--------|
| WO | 2011124426 | * | 10/2011 |
| WO | 2012010455 | * | 1/2012 |
| WO | 2013084648 | * | 6/2013 |

* cited by examiner

REFRIGERATOR AND METHOD OF MANUFACTURING INNER CABINET OF REFRIGERATOR

CROSS-REFERENCE TO RELATED APPLICATION(S) AND CLAIM OF PRIORITY

The present application is related to and claims the benefit of Korean Patent Application No. 10-2014-0046090, filed on Apr. 17, 2014 in the Korean Intellectual Property Office, the disclosure of which is incorporated herein by reference.

TECHNICAL FIELD

Embodiments of the present disclosure relate to a refrigerator with an improved shape of an inner cabinet to improve quality of an exterior and a method of manufacturing the inner cabinet of the refrigerator.

BACKGROUND

In general, a refrigerator includes a body having an inner cabinet and an outer cabinet, a storage chamber formed by the inner cabinet, and a cold air supply device which supplies a cold air to the storage chamber, and thus, the refrigerator is a device capable of freshly storing food. A temperature of the storage chamber is maintained within a predetermined range required to freshly store food.

The above-described storage chamber of the refrigerator includes an open front surface, and the open front surface of the storage chamber is usually closed by a door of the refrigerator to maintain the temperature of the storage chamber. The storage chamber is divided into a refrigeration room and a freezer compartment by a partition, and the refrigeration room and the freezer compartment are opened and closed by a refrigeration room door and a freezer compartment door, respectively.

The body is prepared by coupling the inner cabinet with the outer cabinet, and the inner cabinet is manufactured by vacuum-forming a resin-based sheet having a thickness of approximately 3.5 mm to 5.0 mm. Since the sheet has the thickness of approximately 3.5 mm to 5.0 mm, a corner of the vacuum-formed inner cabinet has a radius of approximately 3.0 mm or more. A level difference greatly occurs between the inner cabinet and the outer cabinet due to the corner of the inner cabinet having a radius of approximately 3.0 mm or more in coupling the inner cabinet with the outer cabinet. Thus, a problem, in that quality of an exterior is reduced, occurs.

SUMMARY

To address the above-discussed deficiencies, it is a primary object to provide a refrigerator in which a corner of an inner cabinet located at a portion coupled with an outer cabinet is formed to have a smaller radius so as to improve a level difference between the inner cabinet and the outer cabinet when the inner cabinet is coupled with the outer cabinet.

In addition, it is another aspect of the present disclosure to provide a method of manufacturing the inner cabinet of the refrigerator in which the corner of the inner cabinet located at the portion coupled with the outer cabinet is formed to have a smaller radius by forcibly elongating a predetermined portion of the inner cabinet.

Additional aspects of the disclosure will be set forth in part in the description which follows and, in part, will be obvious from the description, or may be learned by practice of the disclosure.

In a first example, a refrigerator is provided. The refrigerator includes an inner cabinet in which a storage chamber is formed. The refrigerator also includes an outer cabinet coupled with an outside of the inner cabinet and configured to form an exterior. The refrigerator further includes an insulating material filling between the inner cabinet and the outer cabinet. The inner cabinet includes a storage portion configured to form the storage chamber. The inner cabinet also includes an edge portion configured to extend in a vertical direction toward the outside of the storage portion from a front surface edge of the storage portion and exposed to the outside. The inner cabinet further includes a contact portion configured to extend in a vertical direction toward a rear direction from the edge portion and in contact with the outer cabinet when coupling with the outer cabinet. The inner cabinet includes a seating portion disposed in a rear direction of a front surface portion of the outer cabinet in contact with the contact portion and in parallel with the edge portion. The contact portion extends in a rear direction more than an end of the seating portion adjacent to the contact portion from the edge portion.

The contact portion and the seating portion are connected by a first extending portion extending in a vertical direction toward a rear direction from an end of the seating portion, and a second extending portion extending from the first extending portion to connect the first extending portion and an end of the contact portion. A connection groove in a square shape formed by the first extending portion, the second extending portion, and the contact portion is prepared between the contact portion and the seating portion. The inner cabinet is manufactured by vacuum-forming a resin-based sheet having a thickness of 3.5 mm to 5.0 mm, and a portion adjacent to a corner formed by the edge portion and the contact portion is forcibly elongated to extend in a rear direction more than an end of the seating portion and formed to have a thickness of 1.5 mm or less.

The corner formed by the edge portion and the contact portion is formed to have a radius of 1.5 mm or less. The corner formed by the edge portion and the contact portion is formed to be vertical. A radius of the corner formed by the edge portion and the contact portion is equal to or smaller than a radius of a corner of a front surface portion of the adjacent outer cabinet.

In a second example, a method of manufacturing an inner cabinet of a refrigerator is provided. The method includes heating and softening a resin-based sheet. The method also includes contacting the softened sheet and an inner cabinet forming mold. The method further includes exhausting an air between the sheet and the inner cabinet forming mold to the outside of the inner cabinet forming mold so that the sheet is vacuum-adsorbed to the inner cabinet forming mold. The method includes cooling the sheet formed corresponding to a shape of the inner cabinet forming mold. The method also includes extracting the sheet from the inner cabinet forming mold. The periphery of at least one of corners of the inner cabinet is forcibly elongated to have a smaller thickness when the sheet is vacuum-adsorbed to the inner cabinet forming mold so that at least one radius of the corners of the inner cabinet is formed to be smaller.

The sheet is prepared with a resin-based material having a thickness of 3.5 mm to 5.0 mm. The periphery of at least one of the corners of the inner cabinet is forcibly elongated and formed to have a thickness of 1.5 mm or less. At least one of the corners of the inner cabinet is formed to have a radius of 1.5 mm or less.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure are implemented in any suitably arranged insulating device or refrigeration device. Reference will now be made in detail to the embodiments of the present disclosure, examples of which are illustrated in the accompanying drawings, wherein like reference numerals refer to like elements throughout.

Figure 1:
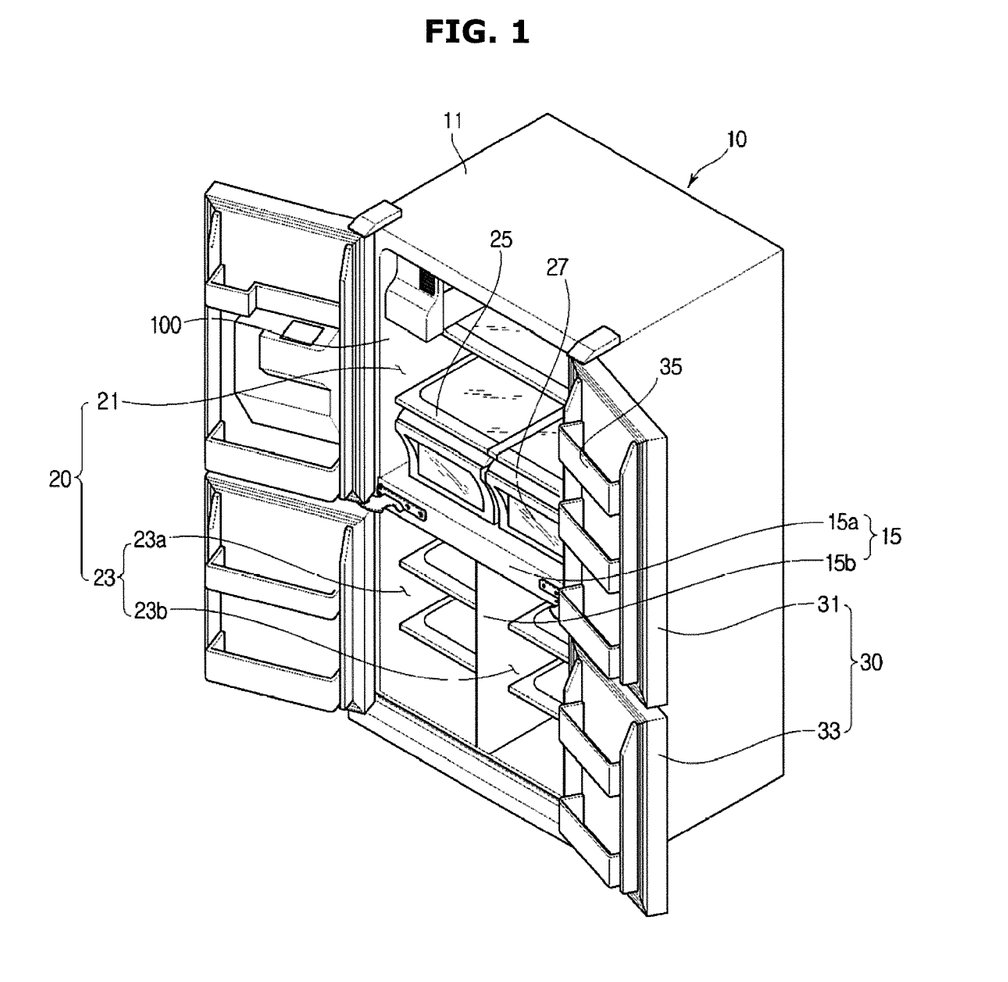
FIG. 1 is a perspective view of an example refrigerator according to this disclosure.
Figure 2:
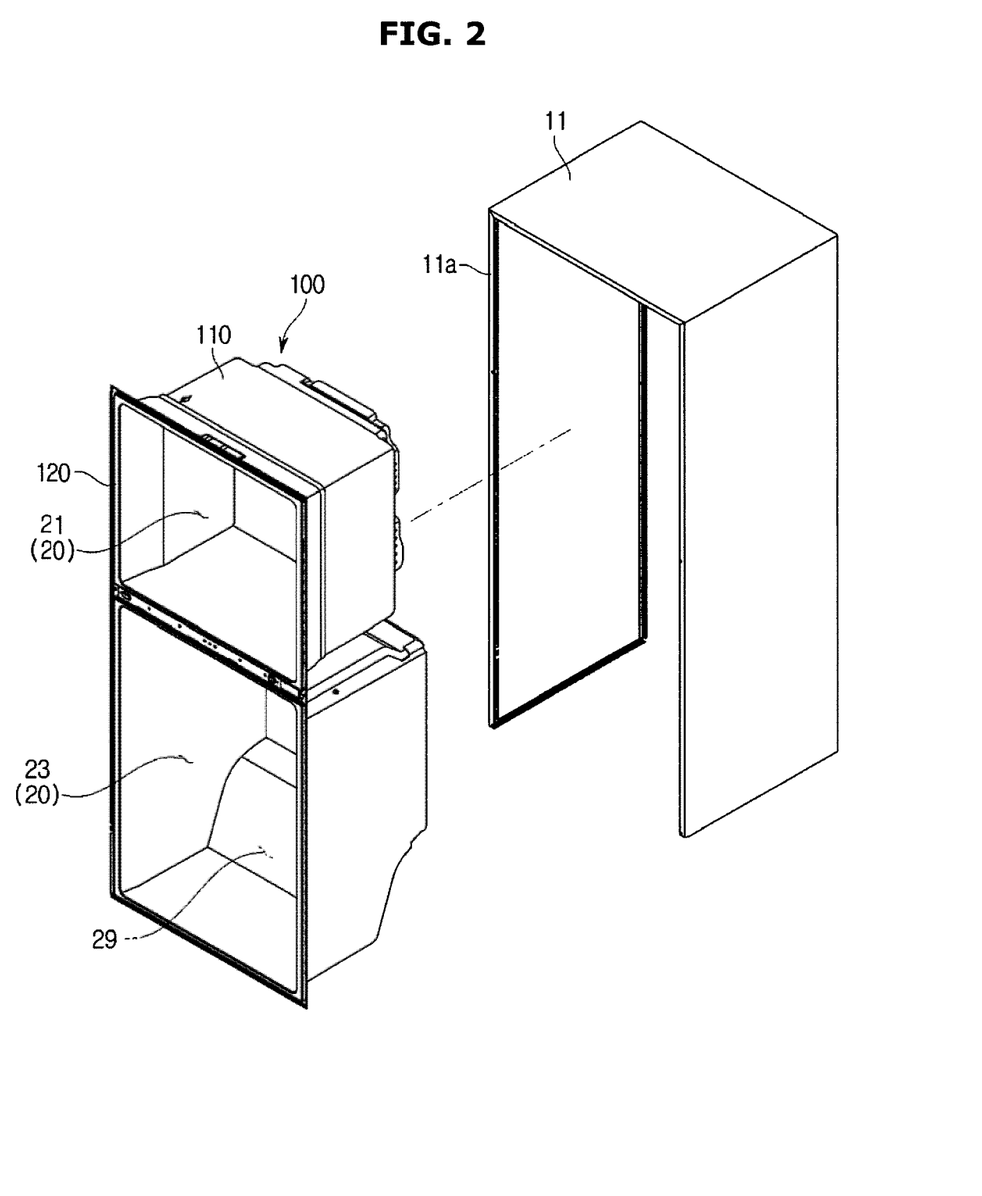
FIG. 2 is a view illustrating an example aspect of coupling an inner cabinet with an outer cabinet of the refrigerator according to this disclosure.
Figure 3:
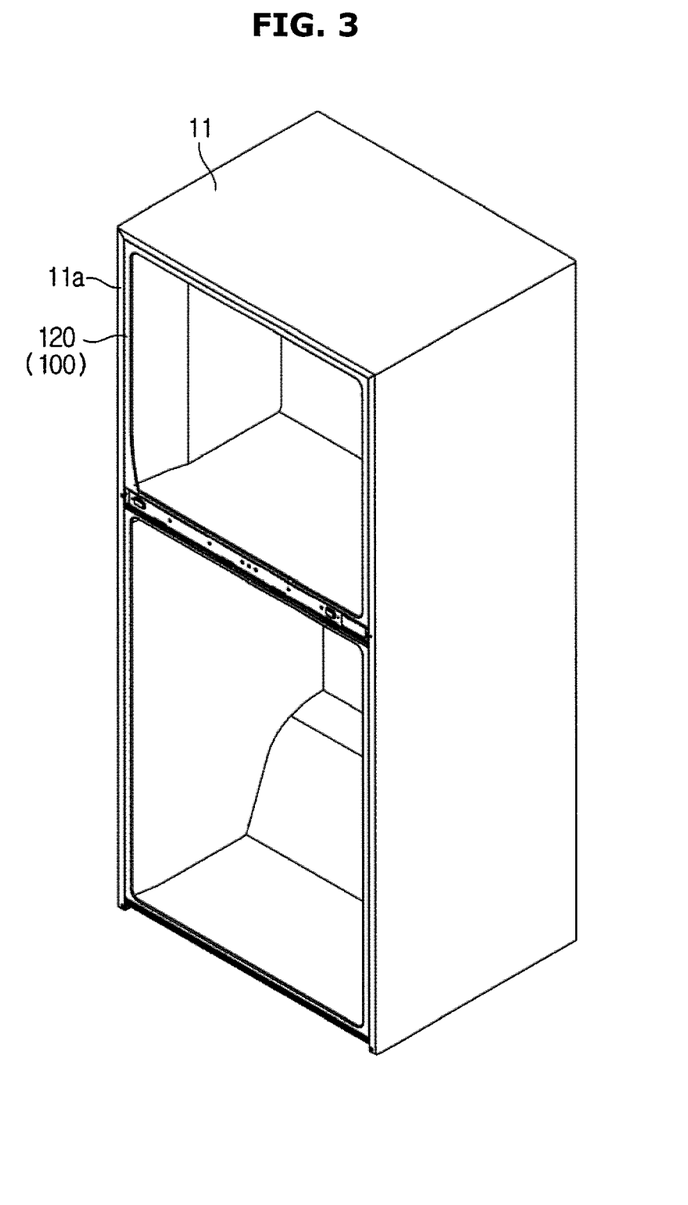
FIG. 3 is a view illustrating an example aspect when the inner cabinet is coupled with the outer cabinet of the refrigerator according to this disclosure.

In the accompanying drawings, the term "front direction" denotes a direction from a rear surface of a refrigerator to a front surface thereof, and the term "rear direction" denotes a direction from the front surface of the refrigerator to the rear surface thereof. As illustrated in FIGS. 1, 2, and 3, a refrigerator includes a body 10, a storage chamber 20, having an open front surface, inside the body 10, a door 30 configured to open and close the open front surface of the storage chamber 20 and rotatably coupled with the body 10.

The body 10 includes an inner cabinet 100 which forms the storage chamber 20, and an outer cabinet 11 coupled with an outside of the inner cabinet 100 and configured to form an exterior, and includes a cold air supply device which supplies cold air to the storage chamber 20. The cold air supply device is configured to include a compressor, a condenser, an expansion valve, an evaporator, a forced draft fan, a cold air duct, or the like, and an insulating material 13 is filled in between the inner cabinet 100 and the outer cabinet 11 of the body 10 to prevent a leakage of the cold air from the storage chamber 20.

A machine room 29 is prepared in a lower portion of the body 10 in a rear direction to install a compressor, which compresses a refrigerant, and a condenser which condenses the compressed refrigerant. The storage chamber 20 is divided into a plurality of storage chambers 20 by partitions 15, a plurality of shelves 25 and storage vessels 27 is prepared inside the storage chambers 20 to store food and drinks, and the open front surface of the storage chamber 20 is opened and closed by the door 30.

The plurality of the storage chambers 20 is formed by the partitions 15, wherein the storage chambers 20 are divided into an upper storage chamber 21 and a lower storage chamber 23 by a first partition 15a disposed horizontally, and divided into a left side storage chamber 23a and a right side storage chamber 23b by a second partition 15b disposed vertically. Although the partitions 15 are illustrated to include the first partition 15a and the second partition 15b in the accompanying drawing, the partitions 15 can include only the first partition 15a disposed in a horizontal line. When the partitions 15 include only the first partition 15a, the storage chambers 20 is divided into only the upper storage chamber 21 and the lower storage chamber 23. The door 30 includes an upper door 31 which opens and closes the upper storage chamber 21, a lower door 33 which opens and closes the lower storage chamber 23, and a plurality of guards 35, which stores food and drinks, is installed on the rear surface of the door 30.

Figure 4:
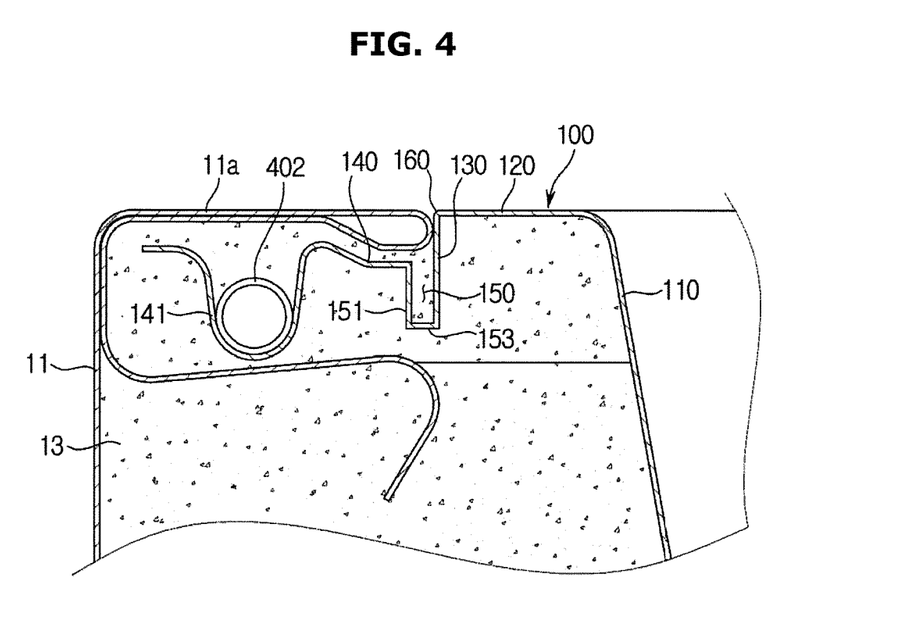
FIG. 4 is a cross-sectional view of an example aspect when the inner cabinet is coupled with the outer cabinet of the refrigerator according to this disclosure.
Figure 5:
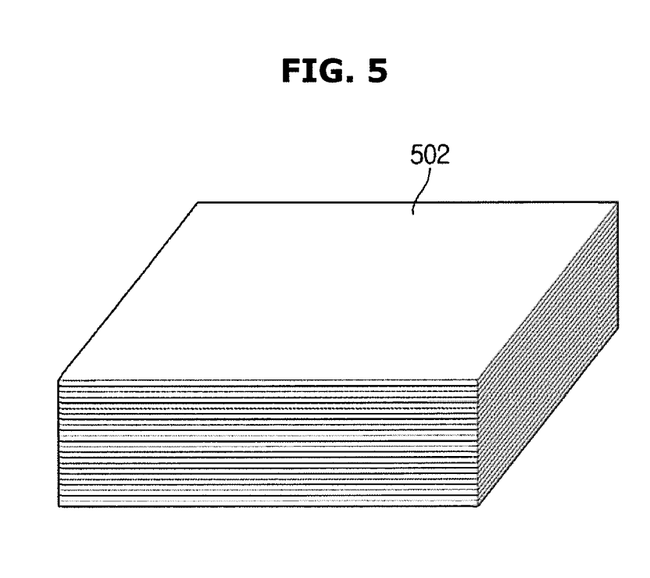
FIG. 5 is a view of an example sheet for manufacturing an inner cabinet according to this disclosure.

As illustrated in FIGS. 2, 3, and 4, the inner cabinet 100 includes a storage portion 110 which forms the storage chamber 20, an edge portion 120 extending in a vertical direction toward an outside of the storage portion 110 from a front surface edge of the storage portion 110, a contact portion 130 extending in a vertical direction toward a rear direction from the edge portion 120, and a seating portion 140 disposed in a rear direction of a front surface portion 11a of an outer cabinet 11 in contact with the contact portion 130 and in parallel with the edge portion 120. The edge portion 120 extends in a vertical direction toward the outside of the storage portion 110 from an edge of the front surface of the storage portion 110, and is exposed to the outside together with the front surface portion 11a of the outer cabinet 11 in coupling with the outer cabinet 11.

When the inner cabinet 100 is coupled with the outer cabinet 11, the front surface portion 11a of the outer cabinet 11 contacts the contact portion 130 and in parallel with the edge portion 120 of the inner cabinet 100. Thus, only the edge portion 120 of the inner cabinet 100 is exposed to the outside in an external view, and the front surface portion 11a of the outer cabinet 11 is exposed to the outside in a front view. The contact portion 130 extends in a vertical direction toward a rear direction from the edge portion 120, and contacts the front surface portion 11a of the outer cabinet 11 when the inner cabinet 100 is coupled with the outer cabinet 11.

The seating portion 140 is disposed in a rear direction of the front surface portion 11a of the outer cabinet 11 in contact with the contact portion 130 and in parallel with the edge portion 120, and a seating groove 141 in which a heat radiation pipe 402 is seated is prepared in the seating portion 140. Since the contact portion 130 extends in a vertical direction toward a rear direction from the edge portion 120, a corner 160 is formed between the contact portion 130 and the edge portion 120.

Since the edge portion 120 of the inner cabinet 100 and the front surface portion 11a of the outer cabinet 11 are exposed to the outside in a front view when the inner cabinet 100 is coupled with the outer cabinet 11, a gap between the edge portion 120 of the inner cabinet 100 and the front surface portion 11a of the outer cabinet 11 is formed when a substantial level difference occurs between the edge portion 120 of the inner cabinet 100 and the front surface portion 11a of the outer cabinet 11. Thus, a substandard exterior appears.

In order to minimize a size of the level difference between the edge portion 120 of the inner cabinet 100 and the front surface portion 11a of the outer cabinet 11, the corner 160 formed between the edge portion 120 and the contact portion 130 of the inner cabinet 100 should be as close to a right angle as possible. The inner cabinet 100 is manufactured by vacuum-forming a resin-based sheet 502 having a thickness of approximately 3.5 mm to 5.0 mm, and a process of manufacturing the inner cabinet 100 is described as follows. Since the inner cabinet 100 has a thickness of approximately 3.5 mm to 5.0 mm, the corner 160 formed between the edge portion 120 and the contact portion 130 of the inner cabinet 100 has a radius of approximately 3 mm or more when the edge portion 120 and the contact portion 130 of the inner cabinet 100 are formed, and thus, a substantial level difference occurs between the edge portion 120 of the inner cabinet 100 and the front surface portion 11a of the outer cabinet 11.

Accordingly, to reduce the level difference between the edge portion 120 of the inner cabinet 100 and the front surface portion 11a of the outer cabinet 11, a radius of the corner 160 should be formed to be smaller by forcibly elongating the contact portion 130 to extend to be long in a rear direction from the edge portion 120 so that a thickness of the periphery of the corner 160 is formed to be smaller when the contact portion 130 of the inner cabinet 100 is formed. The contact portion 130 is forcibly elongated to extend in a rear direction more than an end of the seating portion 140 adjacent to the contact portion from the edge portion 120 so that the periphery of the corner 160 has a smaller thickness, and thus, the inner cabinet 100 on the periphery of the corner 160 have a thickness of approximately 1.5 mm or less.

When a thickness of the inner cabinet 100 on the periphery of the corner 160 is forcibly elongated to be small, a connection groove 150 in a square shape is formed between the contact portion 130 and the seating portion 140. The connection groove 150 is formed by a first extending portion 151 extending in a vertical direction toward a rear direction from an end of the seating portion 140 adjacent to the contact portion 130, a second extending portion 153 extending from the first extending portion 151 to connect the first extending portion 151 with an end of the contact portion 130, and the contact portion 130.

When the thickness of the inner cabinet 100 on the periphery of the corner 160 becomes small, the inner cabinet 100 is easily formed and the corner 160 is formed to have a radius of approximately 1.5 mm or less, which is close to verticality. Here, the radius of the corner 160 is equal to or smaller than that of a corner of the front surface portion 11a of the outer cabinet 11 adjacent to the contact portion 130. Since the radius of the corner 160 becomes as small as 1.5 mm or less, a level difference between the edge portion 120 of the inner cabinet 100 and the front surface portion 11a of the outer cabinet 11 becomes smaller when the inner cabinet 100 is coupled with the outer cabinet 11. Thus, quality of an exterior can be excellent in an external view.

Figure 6:
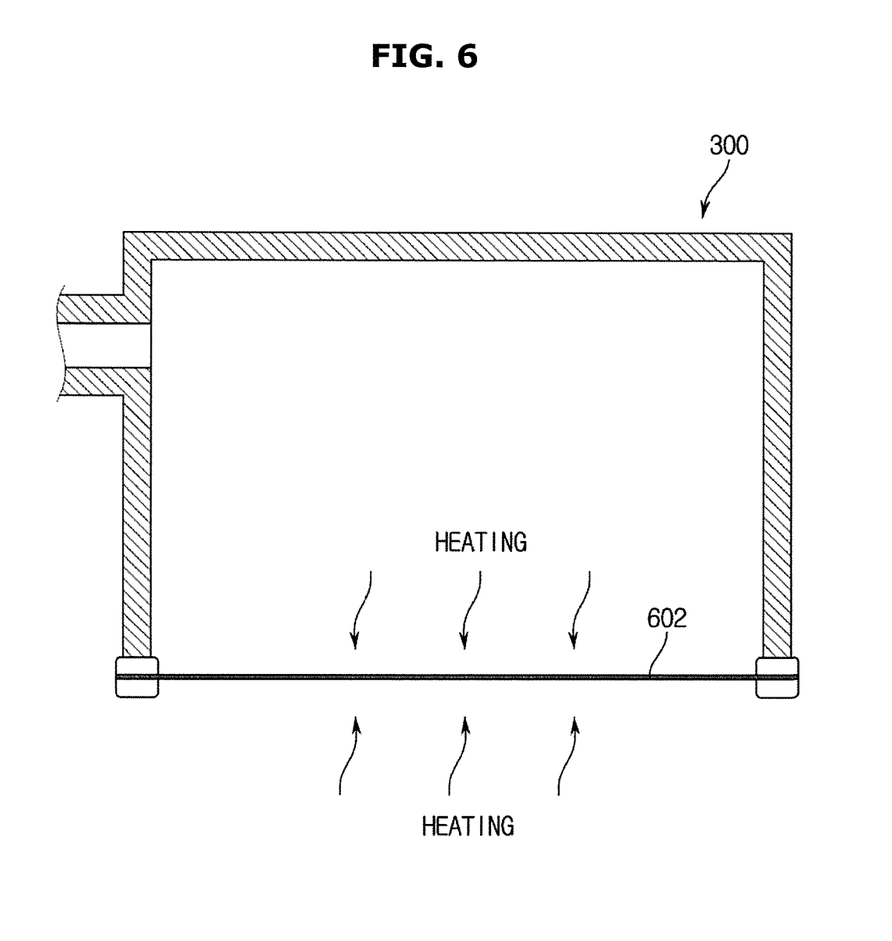
FIG. 6 is a view illustrating an example aspect of heating a sheet according to this disclosure.
Figure 7:
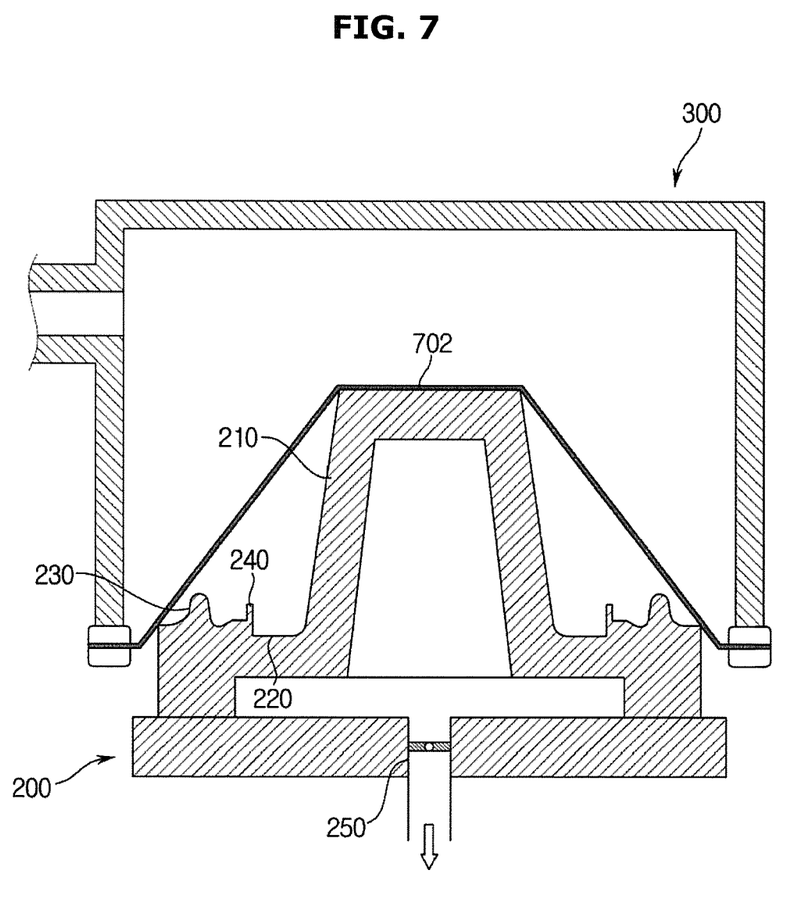
FIG. 7 is a view illustrating an example aspect of contacting a sheet to the inner cabinet forming mold according to this disclosure.
Figure 8:
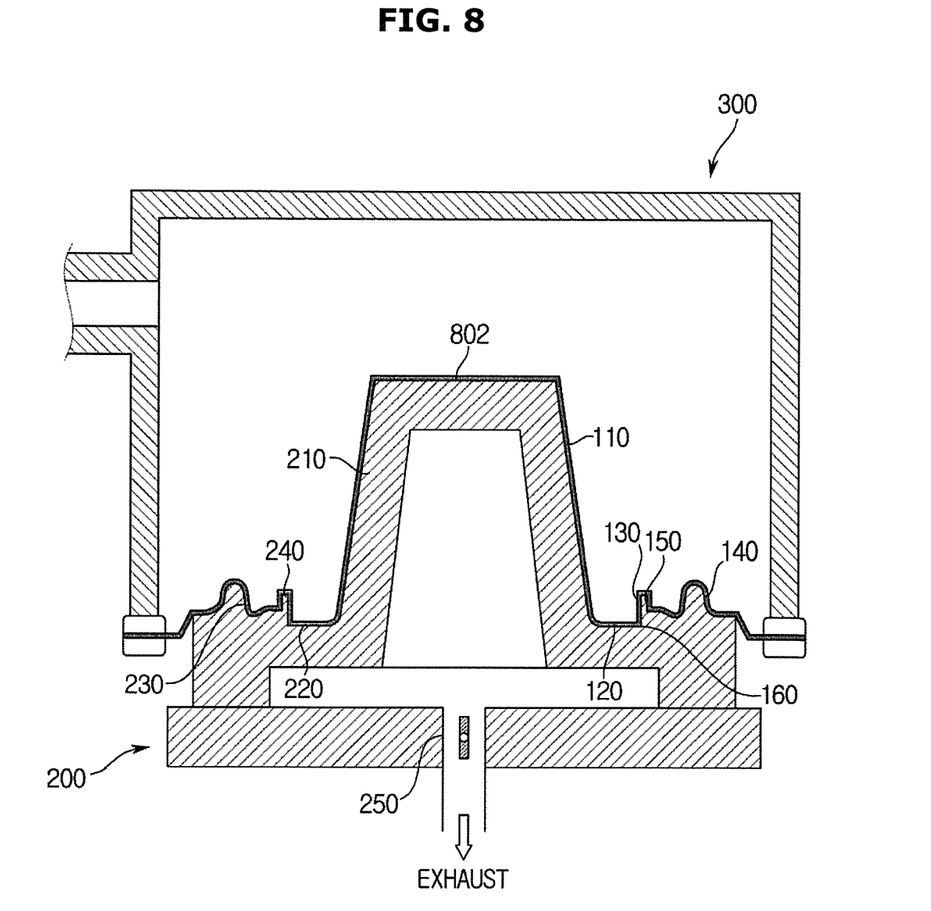
FIG. 8 is a view illustrating an example vacuum-adsorbed aspect of a sheet according to this disclosure.
Figure 9:
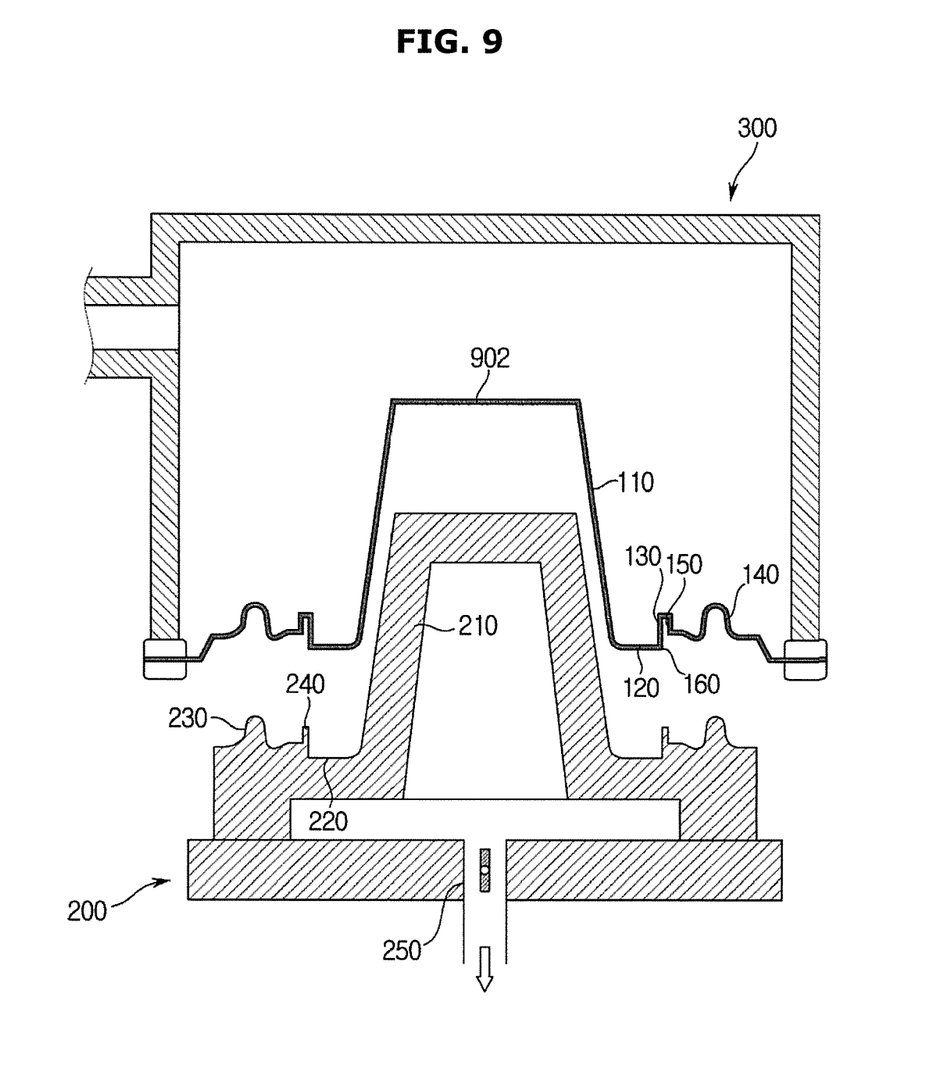
FIG. 9 is a view illustrating an example aspect extracted from the inner cabinet forming mold after a sheet is vacuum-formed according to this disclosure.
Figure 10:
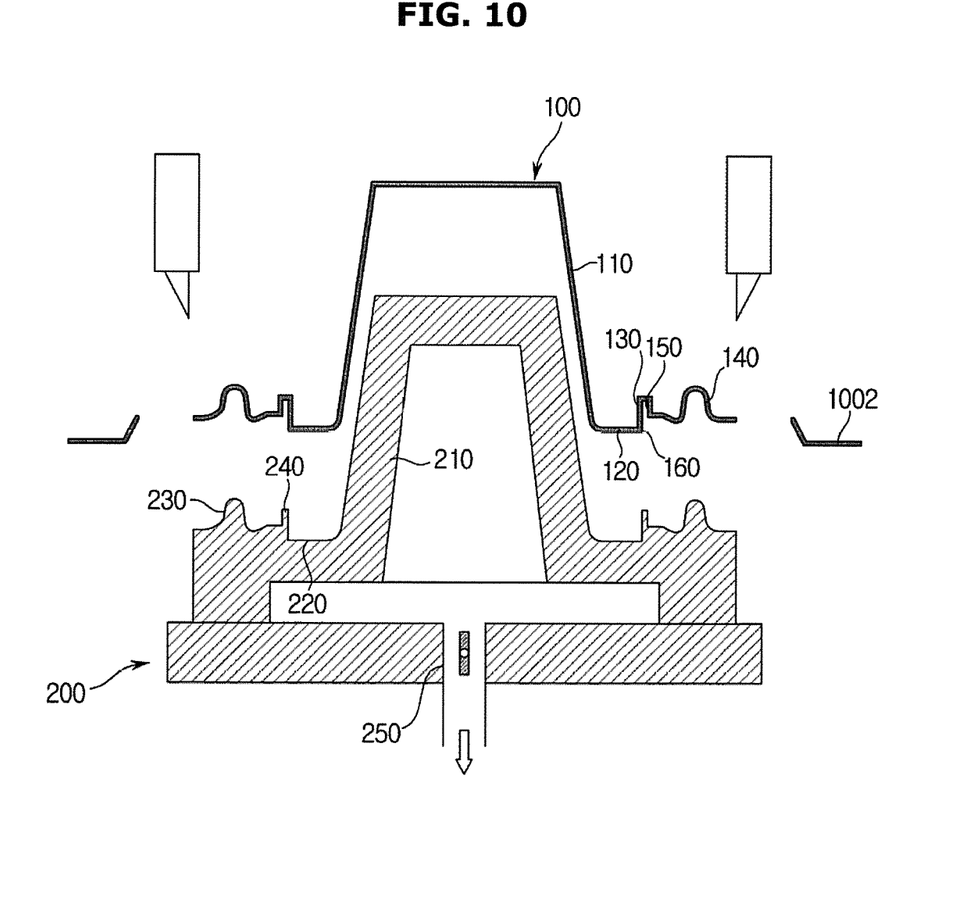
FIG. 10 is a view illustrating an example aspect of cutting any unnecessary portions besides the inner cabinet according to this disclosure.

Subsequently, a process of manufacturing an inner cabinet 100 is described with reference to FIGS. 5, 6, 7, 8, 9, and 10. As described in FIG. 5, when a resin-based sheet 602 is prepared, after the sheet 602 is fixed to a vacuum forming device 300 as shown in FIG. 6, the sheet 602 is heated and softened so that the sheet 602 is easily formed. When the sheet 702 is softened, the sheet 702 is in contact with an inner cabinet forming mold 200 as illustrated in FIG. 7. When the sheet 802 is in contact with the inner cabinet forming mold 200, air between the sheet 802 and the inner cabinet forming mold 200 is exhausted to the outside through an exhaust port 250 of the inner cabinet forming mold 200 so that the sheet 802 is vacuum-adsorbed to the inner cabinet forming mold 200 as illustrated in FIG. 8.

The inner cabinet forming mold 200 has a shape corresponding to the inner cabinet 100 in order to form the sheet 802 into the inner cabinet 100, and includes a first forming portion 210 which forms a storage portion 110 in a shape corresponding to the storage portion 110 of the inner cabinet 100, a second forming portion 220 which forms an edge portion 120 of the inner cabinet 100, a third forming portion 230 which forms a seating portion 140 of the inner cabinet 100, a protruding portion 240 which forms a contact portion 130 of the inner cabinet 100 and forcibly elongates the contact portion 130, and the exhaust port 250 which exhausts air between the sheet 802 and the inner cabinet forming mold 200 to the outside. When the sheet 802 is formed in a shape corresponding to the inner cabinet forming mold 200, since the contact portion 130 is forcibly elongated by the protruding portion 240 of the inner cabinet forming mold 200, the periphery of a corner 160 of the sheet 802 having a thickness of approximately 3.5 mm to 5.0 mm is formed to have a thickness of 1.5 mm or less.

When the thickness of the periphery of the corner 160 becomes as small as 1.5 mm or less, the corner 160 is formed to have a radius of 1.5 mm or less due to easy formation. When the sheet 902 is formed in the shape corresponding to the inner cabinet forming mold 200, after cooling the sheet 902, the sheet 902 is extracted from the inner cabinet forming mold 200 as described in FIG. 9, and then the inner cabinet 100 is manufactured by cutting any unnecessary portions of the sheet 1002 as described in FIG. 10.

As is apparent from the above description, the level difference failure generated between the inner cabinet and the outer cabinet is improved in coupling the inner cabinet with the outer cabinet, and thus, quality of an exterior can be improved.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A refrigerator, comprising:
an inner cabinet in which a storage chamber is formed;
an outer cabinet coupled with an outside of the inner cabinet and configured to form an exterior; and
an insulating material filling between the inner cabinet and the outer cabinet,
wherein the inner cabinet comprises:
a storage portion configured to form the storage chamber;
an edge portion configured to extend in a vertical direction toward the outside of the storage portion from a front surface edge of the storage portion and exposed to the outside;
a contact portion configured to extend straight in a vertical direction toward a rear direction from the edge portion and in contact with the outer cabinet when coupling with the outer cabinet; and
a seating portion disposed in a rear direction of a front surface portion of the outer cabinet in contact with the contact portion and in parallel with the edge portion,
wherein the contact portion extends in a rear direction more than an end of the seating portion adjacent to the contact portion from the edge portion.

2. The refrigerator of claim 1, wherein the contact portion and the seating portion are connected by a first extending portion extending in a vertical direction toward a rear direction from the end of the seating portion, a second extending portion extending from the first extending portion to connect the first extending portion, and an end of the contact portion.

3. The refrigerator of claim 2, wherein a connection groove in a rectangular shape formed by the first extending portion, the second extending portion, and the contact portion is disposed between the contact portion and the seating portion.

4. The refrigerator of claim 1, wherein the inner cabinet is manufactured by vacuum-forming a resin-based sheet having a thickness of 3.5 mm to 5.0 mm, and a portion adjacent to a corner formed by the edge portion and the contact portion is forcibly elongated to extend in a rear direction more than an end of the seating portion to have a thickness of 1.5 mm or less.

5. The refrigerator of claim 4, wherein the corner formed by the edge portion and the contact portion is formed to have a radius of 1.5 mm or less.

6. The refrigerator of claim 5, wherein the corner formed by the edge portion and the contact portion is formed to be vertical.

7. The refrigerator of claim 6, wherein a radius of the corner formed by the edge portion and the contact portion is equal to or smaller than a radius of a corner of the front surface portion of the outer cabinet.

8. The refrigerator of claim 1, wherein the inner cabinet is formed by heating and softening a resin-based sheet.

9. The refrigerator of claim 8, wherein the inner cabinet is formed by contacting the softened resin-based sheet and an inner cabinet forming mold.

10. The refrigerator of claim 9, wherein the inner cabinet is formed by exhausting an air between the softened resin-based sheet and the inner cabinet forming mold to the outside of the inner cabinet forming mold so that the softened resin-based sheet is vacuum-adsorbed to the inner cabinet forming mold.

11. The refrigerator of claim 10, wherein the inner cabinet is formed by cooling the softened resin-based sheet formed corresponding to a shape of the inner cabinet forming mold, and extracting the softened resin-based sheet from the inner cabinet forming mold.

12. The refrigerator of claim 11, wherein a periphery of at least one corner of the inner cabinet is forcibly elongated to have a smaller thickness when the softened resin-based sheet is vacuum-adsorbed to the inner cabinet forming mold so that at least one radius of the corners of the inner cabinet is formed to be smaller.

13. An inner cabinet for use in a refrigerator, the inner cabinet comprising a storage chamber, the inner cabinet comprising:
a storage portion configured to form the storage chamber;
an edge portion configured to extend in a vertical direction toward the outside of the storage portion from a front surface edge of the storage portion and exposed to an outside of the inner cabinet;
a contact portion configured to extend straight in a vertical direction toward a rear direction from the edge portion and in contact with an outer cabinet when coupling with the outer cabinet; and
a seating portion configured to be disposed in a rear direction of a front surface portion of the outer cabinet when in contact with the contact portion and in parallel with the edge portion, and
wherein the contact portion extends in a rear direction more than an end of the seating portion adjacent to the contact portion from the edge portion.

14. The inner cabinet of claim 13, wherein the contact portion and the seating portion are connected by a first extending portion extending in a vertical direction toward a rear direction from the end of the seating portion, a second extending portion extending from the first extending portion to connect the first extending portion, and an end of the contact portion.

15. The inner cabinet of claim 14, wherein a connection groove in a rectangular shape formed by the first extending portion, the second extending portion, and the contact portion is disposed between the contact portion and the seating portion.

16. The inner cabinet of claim 13, wherein the inner cabinet is manufactured by vacuum-forming a resin-based sheet having a thickness of 3.5 mm to 5.0 mm, and a portion adjacent to a corner formed by the edge portion and the contact portion is forcibly elongated to extend in a rear direction more than an end of the seating portion to have a thickness of 1.5 mm or less.

17. The inner cabinet of claim 16, wherein the corner formed by the edge portion and the contact portion is formed to have a radius of 1.5 mm or less.

18. The inner cabinet of claim 17, wherein the corner formed by the edge portion and the contact portion is formed to be vertical.

19. The inner cabinet of claim 18, wherein a radius of the corner formed by the edge portion and the contact portion is equal to or smaller than a radius of a corner of the front surface portion of the outer cabinet.

* * * * *